(12) United States Patent
Zou et al.

(10) Patent No.: US 12,395,220 B2
(45) Date of Patent: Aug. 19, 2025

(54) SYSTEMS AND METHODS FOR CHANNEL STATE INFORMATION REPORT

(71) Applicant: ZTE CORPORATION, Guangdong (CN)

(72) Inventors: Minqiang Zou, Shenzhen (CN); Shujuan Zhang, Shenzhen (CN); Bo Gao, Shenzhen (CN); Wenjun Yan, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 50 days.

(21) Appl. No.: 18/529,249

(22) Filed: Dec. 5, 2023

(65) Prior Publication Data
US 2024/0250729 A1     Jul. 25, 2024

Related U.S. Application Data

(63) Continuation of application No. PCT/CN2023/073439, filed on Jan. 20, 2023.

(51) Int. Cl.
*H04B 7/02*        (2018.01)
*H04B 7/0456*      (2017.01)
*H04B 7/06*        (2006.01)

(52) U.S. Cl.
CPC ......... *H04B 7/0626* (2013.01); *H04B 7/0456* (2013.01); *H04B 7/0632* (2013.01)

(58) Field of Classification Search
CPC .. H04B 7/0626; H04B 7/0456; H04B 7/0632; H04B 7/0478; H04B 7/063; H04B 7/0639; H04L 5/0053; H04L 5/0057; H04L 1/0026

USPC ......................................................... 375/267
See application file for complete search history.

(56) References Cited

U.S. PATENT DOCUMENTS

| | | | |
|---|---|---|---|
| 11,936,456 B2* | 3/2024 | Grossmann | H04B 7/0478 |
| 12,068,999 B2* | 8/2024 | Li | H04L 1/0003 |
| 2013/0336244 A1* | 12/2013 | Kuo | H04L 27/2601 370/328 |
| 2018/0054290 A1* | 2/2018 | Park | H04W 72/21 |
| 2019/0288812 A1* | 9/2019 | Chen | H04L 1/0027 |
| 2020/0295812 A1* | 9/2020 | Rahman | H04B 7/0634 |
| 2021/0352513 A1* | 11/2021 | Rahman | H04W 72/21 |
| 2022/0029682 A1 | 1/2022 | Park et al. | |

(Continued)

FOREIGN PATENT DOCUMENTS

| | | |
|---|---|---|
| CN | 109757127 A | 5/2019 |
| CN | 111327352 A | 6/2020 |

(Continued)

OTHER PUBLICATIONS

Ericsson, "Clarification of CSI reporting (Rel. 15)," 3GPP TSG-RAN WG1 Meeting #111, Tdoc R1-220956, Toulouse France, Nov. 14, 2022 (8 pages).

(Continued)

*Primary Examiner* — Helene E Tayong
(74) *Attorney, Agent, or Firm* — Foley & Lardner LLP

(57) ABSTRACT

The present arrangement relate to systems, methods, and non-transitory computer-readable media for reporting a Channel State Information (CSI) report, the CSI report including a CSI part 1 and a CSI part 2; and communicating, by a wireless communication device with a network, based on the CSI report.

18 Claims, 16 Drawing Sheets

(56) References Cited

U.S. PATENT DOCUMENTS

2022/0239360 A1* 7/2022 Faxér .................. H04B 7/0658
2022/0417778 A1 12/2022 Rahman et al.

FOREIGN PATENT DOCUMENTS

WO  WO-2020/184971 A1  9/2020
WO  WO-2022/194822 A1  9/2022

OTHER PUBLICATIONS

International Search Report and Written Opinion for PCT Appl. No. PCT/CN2023/073439, mailed on Sep. 25, 2023 (38 pages).
Qualcomm Incorporated, "Discussion on even and odd CSI subband index definition," 3GPP TSG RAN WG1 #111, R1-2212081, Nov. 14, 2022 (5 pages).
ZTE, "CSI enhancements for Multi-TRP and FR1 FDD reciprocity", 3GPP TSG RAN WG1 #105-e, R1-2106547, Aug. 27, 2021, e-Meeting (15 pages).
3rd Generation Partnership Project; Technical Specification Group Radio Access Network; NR; Physical layer procedures for data (Release 17), 3GPP TS 38.214 V17.2.0 (Jun. 2022), 228 pages.
Examination Report No. 1 for AU Appl. No. 2023387355, dated Feb. 24, 2025 (3 pages).
Extended European Search Report for EP Appl. No. 23814084.2, dated Feb. 5, 2025 (13 pages).
VIVO, "Discussion on CSI enhancement for high-medium UE velocities and coherent JT", 3GPP TSG RAN WG1 #111, R1-2210992, Nov. 18, 2022, Toulouse, France (27 pages).

* cited by examiner

1000

[Non-Zero Coefficients for All Layers Indicator 1002]

[Non-Zero Coefficients for All Layers and all Q Indicator 1102]

FIG. 11

SYSTEMS AND METHODS FOR CHANNEL STATE INFORMATION REPORT

CROSS-REFERENCE TO RELATED APPLICATION

This application claims the benefit of priority under 35 U.S.C. § 120 as a continuation of International Patent Application No. PCT/CN2023/073439, filed on Jan. 20, 2023, the disclosure of which is incorporated herein by reference in its entirety.

TECHNICAL FIELD

The disclosure relates generally to wireless communications and, more particularly, to multi-user (MU) multiple-input multiple-output (MU-MIMO).

BACKGROUND

In 5th Generation Mobile Network System (5GC), MIMO is a key technology in new radio (NR) systems. MIMO features may be available for both frequency division duplex (FDD) and time division duplex (TDD).

SUMMARY

The example arrangements disclosed herein are directed to solving the issues relating to one or more of the problems presented in the prior art, as well as providing additional features that will become readily apparent by reference to the following detailed description when taken in conjunction with the accompany drawings. In accordance with various arrangements, example systems, methods, devices and computer program products are disclosed herein. It is understood, however, that these arrangements are presented by way of example and are not limiting, and it will be apparent to those of ordinary skill in the art who read the present disclosure that various modifications to the disclosed arrangements can be made while remaining within the scope of this disclosure.

In some arrangements, a plurality of reference signals and a configuration parameter is received. A wireless communication device can determine a Channel State Information (CSI) report based on the plurality of reference signals and the configuration parameter, where the CSI report comprises CSI part 1 and CSI part 2. A wireless communication device can report, to a network, the CSI report.

In some arrangements, a plurality of reference signals and a configuration parameter is transmitted. A network can receive, from a wireless communication device, a Channel State Information (CSI) report, the CSI report comprising CSI part 1 and CSI part 2.

The above and other aspects and their implementations are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 10 is a diagram illustrating an example indicator of a total quantity of non-zero coefficients (NZC) summed across all layers for CSI part 1, according to various arrangements.

FIG. 11 is a diagram illustrating an example indicator of a total quantity of NZC summed across all layers and across all Q for CSI part 1, according to some arrangements.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In a wireless communications system, a wireless device may communicate with a network. As part of the communication process, the wireless device may report Channel State Information (CSI). In some cases, the wireless device may move (e.g., change a physical location to another physical location) at high or medium speeds. Due to the higher speeds, data included in the CSI may be outdated and cause performance loss in the communication between the wireless device and the network. In some examples, the performance loss may be especially present in multi-user (MU) multiple-input multiple-output (MU-MIMO) scenarios. The arrangement disclosed herein provides enhancements (e.g., additions, updates, changes) to CSI measurements and reports, for example, to channel quality indicator (CQI) mapping rule, quantity (e.g., number) of non-zero coefficients (NZC), priority formulation enhancement, Doppler domain (DD) basis indicator, strongest coefficient indicator, grouping location of coefficients, and higher layer parameters. To do so, wireless communications systems may exploit a design of mapping order for CSI part 1 and CSI part 2 associated with Type-II codebook refinement for high to medium velocities.

Figure 1:
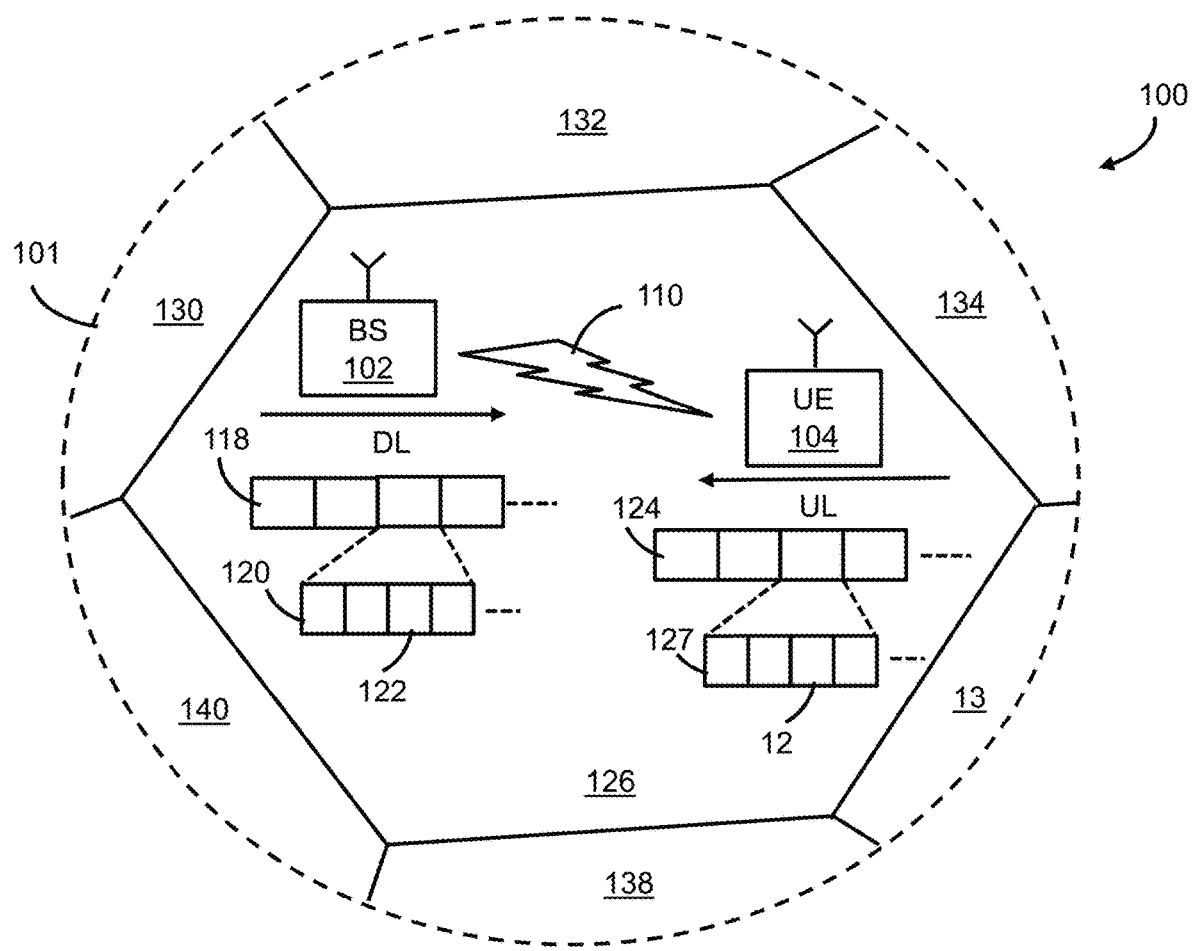
FIG. 1 illustrates an example cellular communication system, according to some arrangements.

FIG. 1 illustrates an example wireless communication system 100 in which techniques disclosed herein may be implemented, in accordance with an implementation of the present disclosure. In the following discussion, the wireless communication system 100 can implement any wireless network, such as a cellular network or a narrowband Internet of things (NB-IOT) network, and is herein referred to as system 100. Such an example system 100 includes a BS 102 and a UE 104 that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one BS operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various implementations of the present solution.

In some implementations, the wireless communication system 100 may support MIMO communication. For example, MIMO is a key technology in new radio (NR) systems. MIMO may be functional in both frequency division duplex (FDD) and time division duplex (TDD) systems, among others. MIMO technologies may utilize reporting mechanisms such as CSI to support communication. CSI reports may include various types, parts, groups, and fields. The techniques described herein may provide enhancements to various aspects of the CSI report and reporting process. For example, a wireless communication device may receive, by a wireless communication device from a network, multiple reference signals and a configuration parameter. The wireless communication device may determine a CSI report based on the multiple reference signals and the configuration parameter, where the CSI report comprises CSI part 1 and CSI part 2. The wireless communication device may report, to the network, the CSI report. In some cases, the reporting process may include one or more of the following: the configuration parameter may be configured for enabling two or more CQIs in the CSI report, the reference signals are aperiodic or semi-persistent, and each of a CSI window length, DD basic unit size, an offset between two CSI reference signal (CSI-RS) resources, and a length of DD basic vector is larger than or equal to a threshold. Additionally, or alternatively, the wireless communication device may send, to the network, a User Equipment (UE) capability report indicating that the wireless communication device supports a number of CQI reports, where the number is a positive integer. The wireless communications system may implement codebooks to further support CSI reporting, among other various uses.

Figure 2:
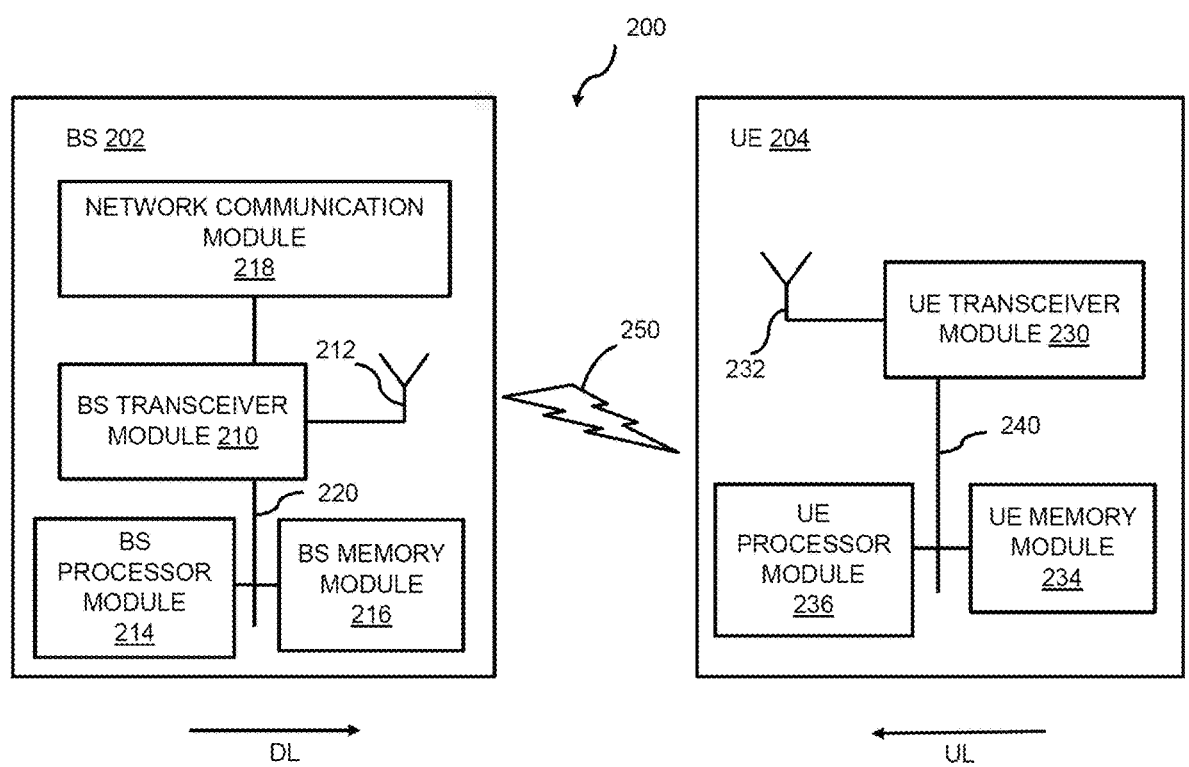
FIG. 2 illustrates block diagrams of an example base station and an example user equipment device, according to some arrangements.

FIG. 2 illustrates a block diagram of an example wireless communication system 200 for transmitting and receiving wireless communication signals, e.g., OFDM/OFDMA signals, in accordance with some implementations of the present solution. The system 200 may include components and elements configured to support known or conventional operating features that need not be described in detail herein. In one illustrative implementation, system 200 can be used to communicate (e.g., transmit and receive) data symbols in a wireless communication environment such as the wireless communication environment 100 of FIG. 1, as described above.

System 200 generally includes a BS 202 and a UE 204. The BS 202 includes a Base Station (BS) transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

The system 200 may further include any number of modules other than the modules shown in FIG. 2. Those skilled in the art will understand that the various illustrative blocks, modules, circuits, and processing logic described in connection with the implementations disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some implementations, the UE transceiver 230 may be referred to herein as an uplink transceiver 230 that includes a Radio Frequency (RF) transmitter and a RF receiver each including circuitry that is coupled to the antenna 232. A duplex switch (not shown) may alternatively couple the uplink transmitter or receiver to the uplink antenna in time duplex fashion. Similarly, in accordance with some implementations, the BS transceiver 210 may be referred to herein as a "downlink" transceiver 210 that includes a RF transmitter and a RF receiver each including circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some implementations, there is close time synchronization with a minimal guard time between changes in duplex direction.

The UE transceiver 230 and the BS transceiver 210 are configured to communicate via the wireless data communication link 250, and cooperate with a suitably configured RF antenna arrangement 212/232 that can support a particular wireless communication protocol and modulation scheme. In some illustrative implementations, the UE transceiver 210 and the BS transceiver 210 are configured to support industry standards such as the Long Term Evolution (LTE) and emerging 5G and 6G standards, and the like. It is understood, however, that the present disclosure is not necessarily limited in application to a particular standard and associated protocols. Rather, the UE transceiver 230 and the BS transceiver 210 may be configured to support alternate, or additional, wireless data communication protocols, including future standards or variations thereof.

In accordance with various implementations, the BS 202 may be an evolved node B (eNB), a serving eNB, a target eNB, a femto station, or a pico station, for example. In some implementations, the UE 204 can be various types of user devices such as a mobile phone, a smart phone, a Personal Digital Assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the methods described in connection with the implementations disclosed herein may be implemented directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some implementations, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the BS 202 that enable bi-directional communication between BS transceiver 210 and other network components and communication nodes configured to communication with the BS 202. For example, network communication module 218 may be configured to support internet or WiMAX traffic. In a typical deployment, without limitation, network communication module 218 provides an 802.3 Ethernet interface such that BS transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Figure 3:
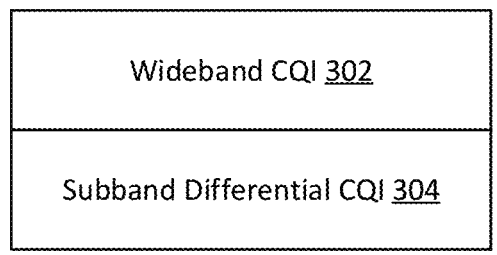
FIG. 3 is a diagram illustrating an example channel quality information (CQI) mapping for channel state information (CSI) part 1, according to various arrangements.

FIG. 3 is a diagram illustrating an example mapping 300 for CSI part 1, according to various arrangements. The mapping 300 may outline a CQI mapping order in one example embodiment of a CSI report for CSI part 1. In some cases, a CSI report may include various indicators, among other data. For example, the CSI report may be made up of rank indicators (RI), precoding matrix indicators (PMI), and CQIs. In some cases, a CQI may be a kind (e.g., type) of CSI.

In some implementations, CQIs may be configured for various granularity. The CQIs may be associated with a wideband or a subband. For example, higher layer configurations (e.g., RRC, MAC-CE, DCI) may indicate mapping for CQIs. In some cases, a first CQI may be associated with a wideband frequency and a second CQI may be associated with a subband frequency (e.g., a segment of the frequency band). Some wireless communication systems may support one CQI for one subband and one CSI reporting instance during a CSI reporting window ($W_{CSI}$) in slots. For instance, one CSI reporting instance may include a wideband CQI 302 and a subband differential CQI 304 (with an increasing order of subband number) and may be mapped into CSI part 1 (e.g., as in mapping 300).

During high to medium velocity communication, Type-II codebook refinement may include time-domain (TD) correlation information and/or DD information. For example, the wireless communications system (e.g., including BS 102 and UE 104) may support using the domain information during the CSI reporting window in slots for Type-II codebook refinement at high to medium velocities. The CSI reporting window may be divided into a first quantity of parts (e.g., X parts) associated with a same quantity of CQIs (e.g., X CQIs) such that the wireless communications system may support X CQIs in one subband and one CSI reporting instance during the CSI reporting window.

Figure 4:
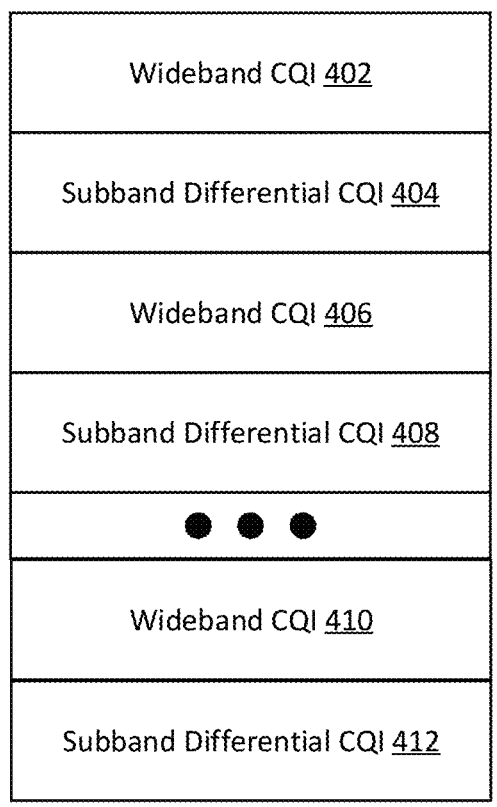
FIG. 4 is a diagram illustrating an example CQI mapping for CSI part 1, according to various arrangements.

FIG. 4 is a diagram illustrating an example CQI mapping 400 for CSI part 1, according to various arrangements. The mapping 400 may outline a CQI mapping order in one example embodiment of a CSI report for CSI part 1. In some cases, the CSI report may include multiple CQI sets. Each CQI set may include a wideband CQI and at least one subband differential CQI associated with the wideband CQI.

In some cases, the mapping 400 may be configured according to a CQI mapping order. For example, a network (e.g., BS 102) may configure a UE 104 with a CQI mapping order for mapping to the CSI part 1 in the CSI report, the network may be preconfigured with the CQI mapping order, the UE 104 may be preconfigured with the CQI mapping order, or any combination thereof. The mapping order may include a wideband CQI 402 for a first CQI set, at least one subband differential CQI 404 for the first CQI set, a wideband CQI 406 for a second CQI set, and at least one subband differential CQI 408 for the second CQI set, in that order. In some implementations, the first CQI set may include the wideband CQI 402 and the subband differential CQI 404 and the second CQI set may include the wideband CQI 406 and the subband differential CQI 408.

In some embodiments, the CQI mapping order may include a quantity of CQI sets. For instance, the quantity may be represented by X, where the first CQI set is first in order, the second CQI set is second in order, and the Xth CQI set is last in order. The Xth CQI set may include a wideband CQI 410 and a subband differential CQI 412. Any integer quantity of CQI sets may be between the second CQI set and the Xth CQI set. In some cases, any one of the CQI sets may not be reported.

Figure 5:
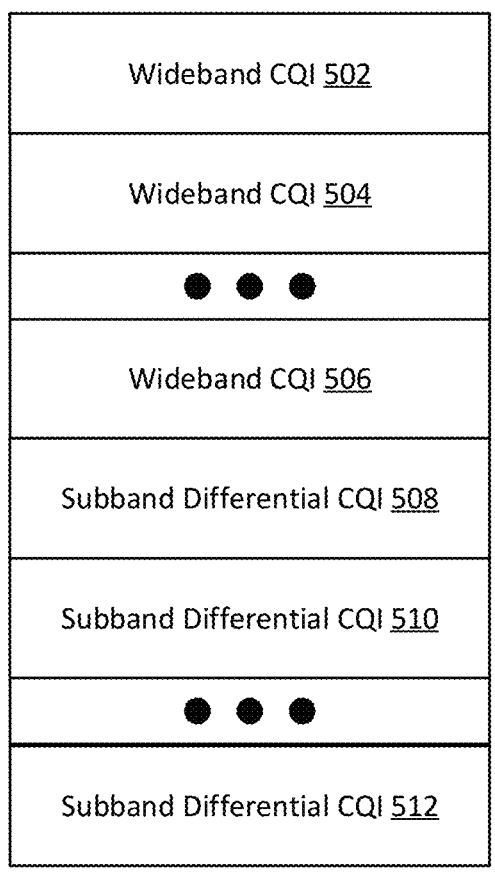
FIG. 5 is a diagram illustrating an example CQI mapping for CSI part 1, according to various arrangements.

FIG. 5 is a diagram illustrating an example CQI mapping 500 for CSI part 1, according to various arrangements. The mapping 500 may outline a CQI mapping order in one example embodiment of a CSI report for CSI part 1. In some cases, the CSI report may include multiple CQI sets. Each CQI set may include a wideband CQI and at least one subband differential CQI associated with the wideband CQI.

In some cases, the mapping 500 may be configured according to a CQI mapping order. For example, a network (e.g., BS 102) may configure a UE 104 with a CQI mapping order for mapping to the CSI part 1 in the CSI report, the network may be preconfigured with the CQI mapping order, the UE 104 may be preconfigured with the CQI mapping order, or any combination thereof. The mapping order may include the wideband CQI for each of the CQI sets and at least one subband differential CQI for each of the CQI sets. The mapping 500 may include a wideband CQI 502 for a first CQI set, a wideband CQI 504 for a second CQI set, at least one subband differential CQI 508 for the first CQI set, and at least one subband differential CQI 510 for the second CQI set, in that order. In some implementations, the first CQI set may include the wideband CQI 502 and the subband differential CQI 508 and the second CQI set may include the wideband CQI 504 and the subband differential CQI 510.

In some embodiments, the CQI mapping order may include a quantity of CQI sets. For instance, the quantity may be represented by X, where the first CQI set includes a wideband CQI and a subband CQI first in order respective to the other wideband and subband CQIs, the second CQI set includes a wideband CQI and a subband CQI second in order respective to the other wideband and subband CQIs, and the Xth CQI set includes a wideband CQI and a subband CQI last in order respective to the other wideband and subband CQIs. The Xth CQI set may include a wideband CQI 506 and a subband differential CQI 512. Any integer quantity of CQI sets may be between the second CQI set and the Xth CQI set. In some cases, any one of the CQI sets may not be reported.

Figure 6:
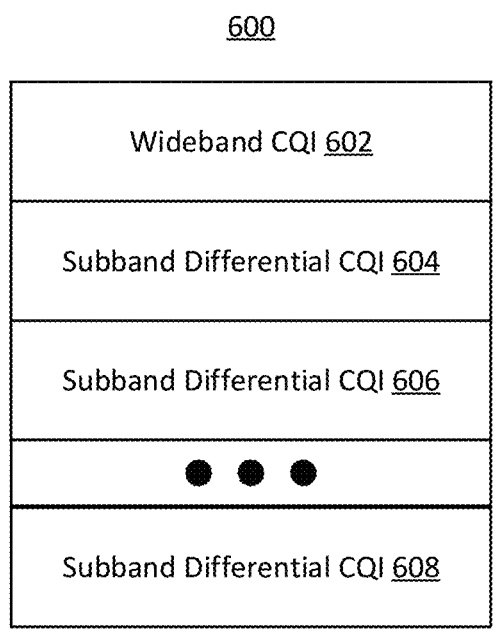
FIG. 6 is a diagram illustrating an example CQI mapping for CSI part 1, according to various arrangements.

FIG. 6 is a diagram illustrating an example CQI mapping for CSI part 1, according to various arrangements. The mapping 600 may outline a CQI mapping order in one example embodiment of a CSI report for CSI part 1. In some cases, the CSI report may include multiple CQI sets. A first CQI set may include a wideband CQI 602 and at least one subband differential CQI 604 associated with the wideband CQI 602. Each of one or more second CQI sets may include at least one second subband differential CQI 606 associated with the wideband CQI 602. Thus, each set of subband differential CQI may be associated with the wideband CQI 602 (e.g., the first set of wideband CQI).

In some cases, the mapping 600 may be configured according to a CQI mapping order. For example, a network (e.g., BS 102) may configure a UE 104 with a CQI mapping order for mapping to the CSI part 1 in the CSI report, the network may be preconfigured with the CQI mapping order, the UE 104 may be preconfigured with the CQI mapping order, or any combination thereof. The mapping 600 may include the wideband CQI 602 for the first CQI set, the at least one first subband differential CQI 604 for the first CQI set, and the at least one second subband differential CQI 606 for each of the one or more second CQI sets, in that order according to the mapping order.

In some embodiments, the CQI mapping order may include a quantity of CQI sets. For instance, the quantity may be represented by X, where the wideband CQI 602 is associated with each CQI set of the quantity of CQI sets. The Xth CQI set may include the wideband CQI 602 and a subband differential CQI 608 last in order of the mapping 600. Any integer quantity of CQI sets may be between the second CQI set and the Xth CQI set. In some cases, any one of the CQI sets may not be reported.

Figure 7:
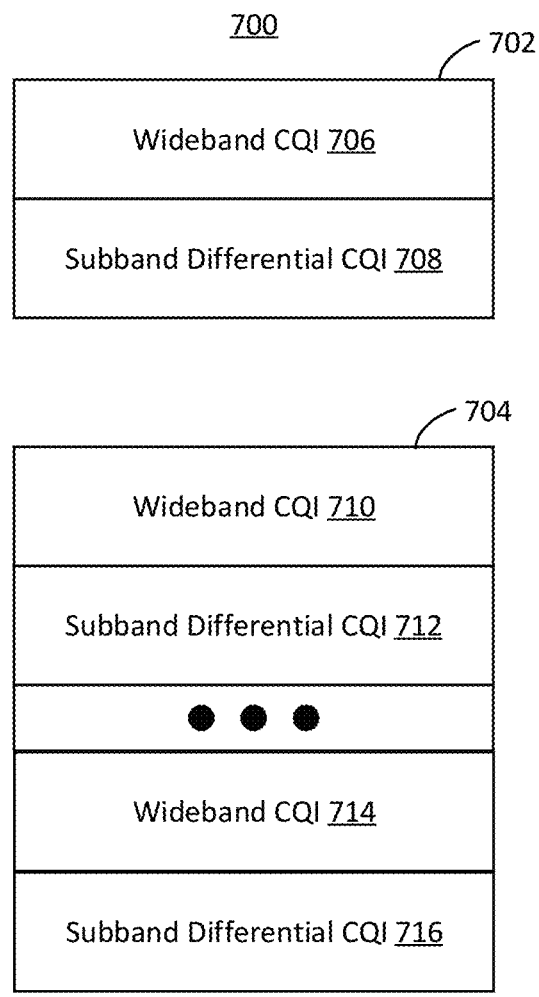
FIG. 7 is a diagram illustrating an example CQI mapping for CSI part 1 and CSI part 2, according to various arrangements.

FIG. 7 is a diagram illustrating an example CQI mapping 700 for CSI part 1 and CSI part 2, according to various arrangements. The mapping 700 may outline a CQI mapping order in one example embodiment of a CSI report for CSI part 1 and CSI part 2. In some cases, the CSI report may include multiple CQI sets. Each CQI set may include a wideband CQI and at least one subband differential CQI associated with the wideband CQI.

In some cases, the mapping 700 may be configured according to a CQI mapping order. For example, a network (e.g., BS 102) may configure a UE 104 with a CQI mapping order for mapping to the CSI part 1 and the CSI part 2 in the CSI report, the network may be preconfigured with the CQI mapping order, the UE 104 may be preconfigured with the CQI mapping order, or any combination thereof. The mapping order may include a first and second portion. The first portion 702 may be associated with CSI part 1 and include a wideband CQI 706 for a first CQI set and at least one subband differential CQI 708 for the first CQI set, in that order. The second portion 704 may be associated with CSI part 2 and include a wideband CQI 710 for a second CQI set, at least one subband differential CQI 712 for the second CQI set, a wideband CQI 714 for a third CQI set, and at least one subband differential CQI 716 for the third CQI set, in that order. In some implementations, the first CQI set may include the wideband CQI 706 and the subband differential CQI 708, the second CQI set may include the wideband CQI 710 and the subband differential CQI 712, and the third CQI set may include the wideband CQI 714 and the subband differential CQI 716.

In some embodiments, the CQI mapping order may include a quantity of CQI sets. For instance, the quantity may be represented by X, where the first CQI set is first in order, the second CQI set is second in order, and the Xth CQI set is last in order (e.g., the third CQI set in this example). Any integer quantity of CQI sets may be between the second CQI set and the Xth CQI set. In some cases, any one of the CQI sets may not be reported.

Figure 8:
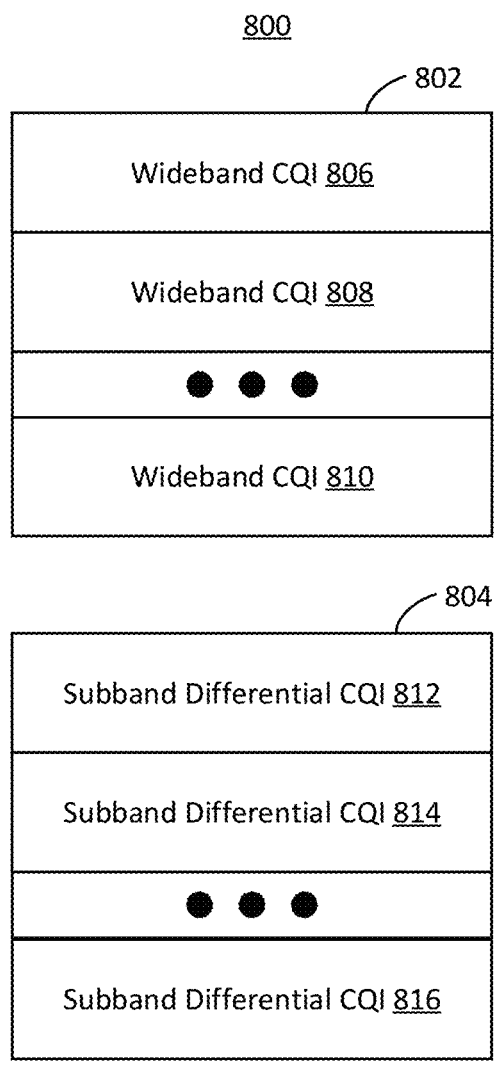
FIG. 8 is a diagram illustrating an example CQI mapping for CSI part 1 and CSI part 2, according to various arrangements.

FIG. 8 is a diagram illustrating an example CQI mapping 800 for CSI part 1 and CSI part 2, according to various arrangements. The mapping 800 may outline a CQI mapping order in one example embodiment of a CSI report for CSI part 1 and CSI part 2. In some cases, the CSI report may include multiple CQI sets. Each CQI set may include a wideband CQI and at least one subband differential CQI associated with the wideband CQI.

In some cases, the mapping 800 may be configured according to a CQI mapping order. For example, a network (e.g., BS 102) may configure a UE 104 with a CQI mapping order for mapping to the CSI part 1 in the CSI report, the network may be preconfigured with the CQI mapping order, the UE 104 may be preconfigured with the CQI mapping order, or any combination thereof. The mapping order may include a first and second portion. The first portion 802 may be associated with CSI part 1 and include the wideband CQI for each of the CQI sets. For example, the first portion may include a wideband CQI 806 for a first CQI set and a wideband CQI 808 for a second CQI set, in that order. The second portion 804 may be associated with CSI part 2 and include at least one subband differential CQI for each of the CQI sets. For example, the second portion may include at least one subband differential CQI 812 for the first CQI set and at least one subband differential CQI 814 for the second CQI set, in that order. In some implementations, the first CQI set may include the wideband CQI 806 and the subband differential CQI 812 and the second CQI set may include the wideband CQI 808 and the subband differential CQI 814.

In some embodiments, the CQI mapping order may include a quantity of CQI sets. For instance, the quantity may be represented by X, where the first CQI set includes a wideband CQI and a subband CQI first in order respective to the other wideband and subband CQIs, the second CQI set includes a wideband CQI and a subband CQI second in order respective to the other wideband and subband CQIs, and the Xth CQI set includes a wideband CQI and a subband CQI last in order respective to the other wideband and subband CQIs. The Xth CQI set may include a wideband CQI 810 and a subband differential CQI 816. Any integer quantity of CQI sets may be between the second CQI set and the Xth CQI set. In some cases, any one of the CQI sets may not be reported.

Figure 9:
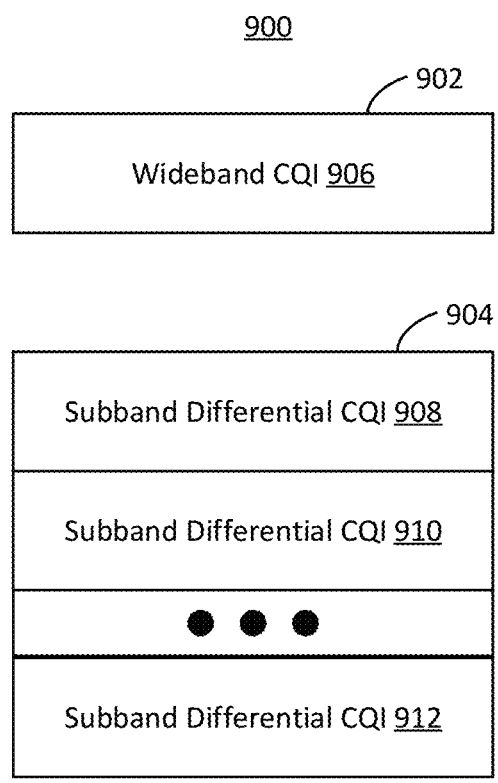
FIG. 9 is a diagram illustrating an example CQI mapping for CSI part 1 and CSI part 2, according to various arrangements.

FIG. 9 is a diagram illustrating an example CQI mapping 900 for CSI part 1 and CSI part 2, according to various arrangements. The mapping 900 may outline a CQI mapping order in one example embodiment of a CSI report for CSI part 1 and CSI part 2. In some cases, the CSI report may include multiple CQI sets. A first CQI set may include a wideband CQI 906 and at least one first subband differential CQI 908 associated with the wideband CQI 906. Each of one or more second CQI sets may include at least one second subband differential CQI 910 associated with the wideband CQI 906 in the first CQI set. Thus, each set of subband differential CQI may be associated with the wideband CQI 906 (e.g., the first set of wideband CQI).

In some cases, the mapping 900 may be configured according to a CQI mapping order. For example, a network (e.g., BS 102) may configure a UE 104 with a CQI mapping order for mapping to the CSI part 1 in the CSI report, the network may be preconfigured with the CQI mapping order, the UE 104 may be preconfigured with the CQI mapping order, or any combination thereof. The mapping order may include a first and second portion. The first portion 902 may be associated with CSI part 1 and include the wideband CQI 906 for the first CQI set. The second portion 904 may be associated with CSI part 2 and include the at least one first subband differential CQI 908 for the first CQI set and the at least one second subband differential CQI 910 for each of the one or more second CQI sets, in that order according to the mapping order.

In some embodiments, the CQI mapping order may include a quantity of CQI sets. For instance, the quantity may be represented by X, where the wideband CQI 906 is associated with each CQI set of the quantity of CQI sets. The Xth CQI set may include the wideband CQI 906 and a subband differential CQI 912 last in order of the mapping 900. Any integer quantity of CQI sets may be between the second CQI set and the Xth CQI set. In some cases, any one of the CQI sets may not be reported.

FIG. 10 is a diagram illustrating an example indicator 1000 of a total quantity of NZC summed across all layers for CSI part 1, according to various arrangements. In some cases, one CSI reporting instance, for CSI part 1, may include an indicator 1002 for NZC for all layers. The indicator 1002 may indicate a total quantity (e.g., number) of NZCs combined (e.g., summed) ($K^{NZ}$) across all layers. In some implementations, the value of $K^{NZ}$ may depend on rank. For example, if a total (e.g., max) allowed rank is one, then $K^{NZ}=K_0$; otherwise, if the total allowed rank is not one, then $K^{NZ}=2K_0$. In some implementations, $K_0$ may calculated according to the following equation:

$$K_0 = \left\lceil 2L \left\lceil p_1 \times \frac{N_3}{R} \right\rceil \beta \right\rceil, \qquad \text{Equation 1}$$

where L indicates antenna ports, $p_1$ indicates antenna port number, $N_3$ indicates a precoding matrix, R indicates the quantity of precoding matrix indicators (PMI) subbands per CQI subband, and $\beta$ indicates amplitude scaling.

FIG. 11 is a diagram illustrating an example indicator 1100 of a total quantity of NZC summed across all layers and across all Q for CSI part 1, according to some arrangements. During high to medium velocity communication, Type-II codebook refinement may include an additional parameter. For example, a parameter Q may be used for time compression. In some cases, the parameter Q may indicate a quantity of DD basis.

In some implementations, an indicator 1102 may indicate a total quantity of NZCs in one CSI report for CSI part 1. For example, a wireless device (e.g., a UE 104) may combine (e.g., sum) the total quantity of NZCs across all layers and across all Q and report the indicator 1102 in CSI part 1 for one CSI reporting instance. Thus, the CSI report may include, for the CSI part 1, an indicator for a total number of NZCs summed across multiple layers and across multiple numbers of DD basis, the NZC being associated with at least one PMI.

In a first example embodiment, the wireless device (or another wireless node of a wireless communications system) may generate the indicator 1102 according to Equation 1, as described herein with reference to FIG. 10, where if a total (e.g., maximum) allowed rank is one, then the total number of NZCs is a value (e.g., $K^{NZ}=K_0$); otherwise, if the total allowed rank is a number other than one, then the total number of NZCs is two times the value (e.g., $K^{NZ}=2K_0$). In a second example embodiment, the wireless device may generate the indicator 1102 according to Equation 1, where if a total (e.g., maximum) allowed rank is one, then the total number of NZCs is a value multiplied by a number of the DD basis (e.g., $K^{NZ}=K_0*Q$); otherwise, if the total allowed rank is a number other than one, then the total number of NZCs is two times the value times the number of the DD basis (e.g., $K^{NZ}=2K_0*Q$). In a third example embodiment, the wireless device may generate the indicator 1102 according to the following equation:

$$K_0 = \left\lceil 2L \left\lceil p_1 \times \frac{N_3}{R} \right\rceil Q\beta \right\rceil, \qquad \text{Equation 2}$$

where if a total (e.g., maximum) allowed rank is one, then the total number of NZCs is a value (e.g., $K^{NZ}=K_0$); otherwise, if the total allowed rank is a number other than one, then the total number of NZCs is two time the value (e.g., $K^{NZ}=2K_0$), where the value is determined based on a number of the DD basis. For example, the wireless device may determine the value based on Equation 2.

Figure 12:
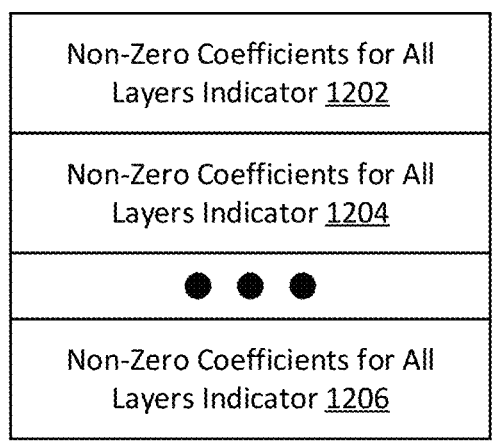
FIG. 12 is a diagram illustrating an example indicator of a total quantity of NZC summed across all layers and per Q for CSI part 1, according to various arrangements.

FIG. 12 is a diagram illustrating an example indicator 1200 of a total quantity of NZC summed across all layers and per Q for CSI part 1, according to various arrangements. During high to medium velocity communication, Type-II codebook refinement may include an additional parameter. For example, a parameter Q may be used for time compression. In some cases, the parameter Q may indicate a quantity of DD basis.

In some implementations, the indicator 1200 may include multiple indications. For example, a wireless device (e.g., a UE 104) may combine (e.g., sum) the total quantity of NZCs across all layers and per Q and report the indicator 1200 in CSI part 1 for one CSI reporting instance. Thus, the CSI report may include, for the CSI part 1, an indicator for a total number of NZCs summed across multiple layers for each number of multiple numbers of DD basis.

In a first example embodiment, the wireless device (or another wireless node of a wireless communications system) may generate the indicator 1200 according to Equation 1, as described herein with reference to FIG. 10, where if a total (e.g., maximum) allowed rank is one, then the total number of NZCs is a value for the multiple numbers of the DD basis (e.g., $K^{NZ}=K_0$); otherwise, if the total allowed rank is a number other than one, then the total number of the NZCs is two times the value for the multiple numbers of the DD basis (e.g., $K^{NZ}=2K_0$). For example, the indicator 1200 may include an indication for each q. In some cases, the value q may begin at an initial value (e.g., zero) and increase (e.g., increment) by an integer value (e.g., one) for each value Q (e.g., for each DD basis). Referring to FIG. 12, the indicator 1200 may include a first indication 1202 for the total number of NZCs summed across all layers for a first Q (e.g., q=0), a second indication 1204 for the total number of NZCs summed across all layers for a second Q (e.g., q=1), and a third indication 1206 for the total number of NZCs summed across all layers for a last Q (e.g., q=Q−1). The indicator 1200 may include a quantity of indications equal to the quantity of Q.

In a second example embodiment, the wireless device may generate the indicator 1200 according to Equation 1, where if a total (e.g., maximum allowed rank is one, then the total number of NZCs is a respective value (e.g., $K_{(i)}$) for each of the multiple numbers of the DD basis (e.g., $K_{(i)}^{NZ}=K_{(i)}$); otherwise, if the total allowed rank is a number other than one, then the total number of NZCs is two times the respective value for each of the plurality of numbers of the DD basis (e.g., $K_{(i)}^{NZ}=2K_{(i)}$). For example, the indicator 1200 may include an indication for each q. In some cases, the value q may begin at an initial value (e.g., zero) and increase (e.g., increment) by an integer value (e.g., one) for each value Q (e.g., for each DD basis). Referring to FIG. 12, the indicator 1200 may include a first indication 1202 for the total number of NZCs summed across all layers for a first Q (e.g., q=0), a second indication 1204 for the total number of NZCs summed across all layers for a second Q (e.g., q=1), and a third indication 1206 for the total number of NZCs summed across all layers for a last Q (e.g., q=Q−1). The indicator 1200 may include a quantity of indications equal to the quantity of Q.

Figure 13:
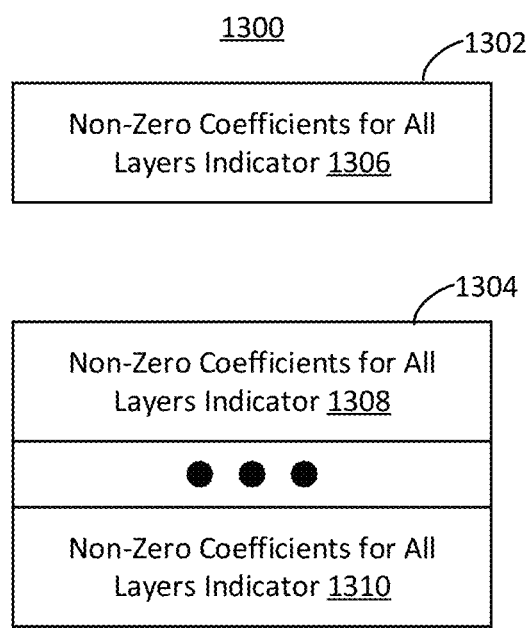
FIG. 13 is a diagram illustrating an example indicator of a total quantity of NZC summed across all layers and associated with one or more DD basis for CSI part 1 and/or CSI part 2, according to various arrangements.

FIG. 13 is a diagram illustrating an example indicator 1300 of a total quantity of NZC summed across all layers and associated with one or more DD basis for CSI part 1 and/or CSI part 2, according to various arrangements. During high to medium velocity communication, Type-II codebook refinement may include an additional parameter. For example, a parameter Q may be used for time compression. In some cases, the parameter Q may indicate a quantity of DD basis.

In some implementations, the indicator 1300 may include multiple indications. For example, a wireless device (e.g., a UE 104) may combine (e.g., sum) the total quantity of NZCs across all layers for a first portion of Q and report an indicator 1302 (e.g., a first portion of the indicator 1300 associated with CSI part 1) in CSI part 1 for one CSI reporting instance. Additionally, the wireless device may combine the total quantity of NZCs across all layers for a second portion of Q and report an indicator 1304 (e.g., a second portion of the indicator 1300 associated with CSI part 2) in CSI part 2 for one CSI reporting instance. Thus, the CSI report may include, for the CSI part 1, a first indicator for a first total number of NZCs summed across multiple layers for a first number of DD basis and, for the CSI part 2, a second indicator for a second total number of NZCs summed across multiple layers for a second number of DD basis.

In a first example embodiment, the wireless device (or another wireless node of a wireless communications system) may generate the indicator 1302 according to Equation 1, as described herein with reference to FIG. 10, where if a total (e.g., maximum) allowed rank is one, then the first total number of NZCs is a value (e.g., $K^{NZ}=K_0$); otherwise, if the total allowed rank is a number other than one, then the first total number of the NZCs is two times the value (e.g., $K^{NZ}=2K_0$). The wireless device may generate the indicator 1304 according to Equation 1, where if a total (e.g., maximum) allowed rank is one, then the second total number of NZCs for each of the second numbers of DD basis is the value (e.g., $K^{NZ}=K_0$); otherwise, if the total allowed rank is a number other than one, then the second total number of the NZCs for each of the second numbers of DD basis is two times the value (e.g., $K^{NZ}=2K_0$).

In some examples, the indicator 1300 may include an indication for each q. In some cases, the value q may begin at an initial value (e.g., zero) and increase (e.g., increment) by an integer value (e.g., one) for each value Q (e.g., for each DD basis). Referring to FIG. 13, the indicator 1302 may include a first indication 1306 for the first total number of NZCs summed across all layers for a first Q (e.g., q=0). The indicator 1304 may include a first indication 1308 for the second total number of NZCs summed across all layers for a second Q (e.g., q=1) and a third indication 1310 for a third total number of NZCs summed across all layers for a last Q (e.g., q=Q−1). The indicator 1304 may include a quantity of indications equal to the quantity of Q minus one (e.g., for the indication 1306 included in the indicator 1302).

In a second example embodiment, the wireless device (or another wireless node of a wireless communications system) may generate the indicator 1302 according to the following equation:

$$K_{(i)} = \left\lceil 2L \left\lceil p_1 \times \frac{N_3}{R} \right\rceil \beta_i \right\rceil, \qquad \text{Equation 3}$$

where $\beta_i$ is configured by higher layer parameters (e.g., i={0,1, ..., Q−1}) and is within the range 0<$\beta_i$<1. If a total (e.g., maximum) allowed rank is one, then the first total number of NZCs is a first value (e.g., $K_{(i)}^{NZ}=K_{(o)}$); otherwise, if the total allowed rank is a number other than one, then the first total number of the NZCs is two times the first value (e.g., $K_{(i)}^{NZ}=2K_{(o)}$). The wireless device may generate the indicator 1304 according to Equation 1, where if a total (e.g., maximum) allowed rank is one, then the second total number of NZCs for each of the second numbers of DD basis is a respective second value (e.g., $K_{(i)}^{NZ}=K_{(i)}$); otherwise, if the total allowed rank is a number other than one, then the second total number of the NZCs for each of the second numbers of DD basis is two times the respective second value (e.g., $K_{(i)}^{NZ}=2K_{(i)}$).

In some examples, the indicator 1300 may include an indication for each q. In some cases, the value q may begin at an initial value (e.g., zero) and increase (e.g., increment) by an integer value (e.g., one) for each value Q (e.g., for each DD basis). Referring to FIG. 13, the indicator 1302 may include a first indication 1306 for the first total number of NZCs summed across all layers for a first Q (e.g., q=0). The indicator 1304 may include a first indication 1308 for the second total number of NZCs summed across all layers for a respective second Q (e.g., q=1) and a third indication 1310 for a third total number of NZCs summed across all layers for a respective last Q (e.g., q=Q−1). The indicator 1304 may include a quantity of indications equal to the quantity of Q minus one (e.g., for the indication 1306 included in the indicator 1302).

Figure 14A:
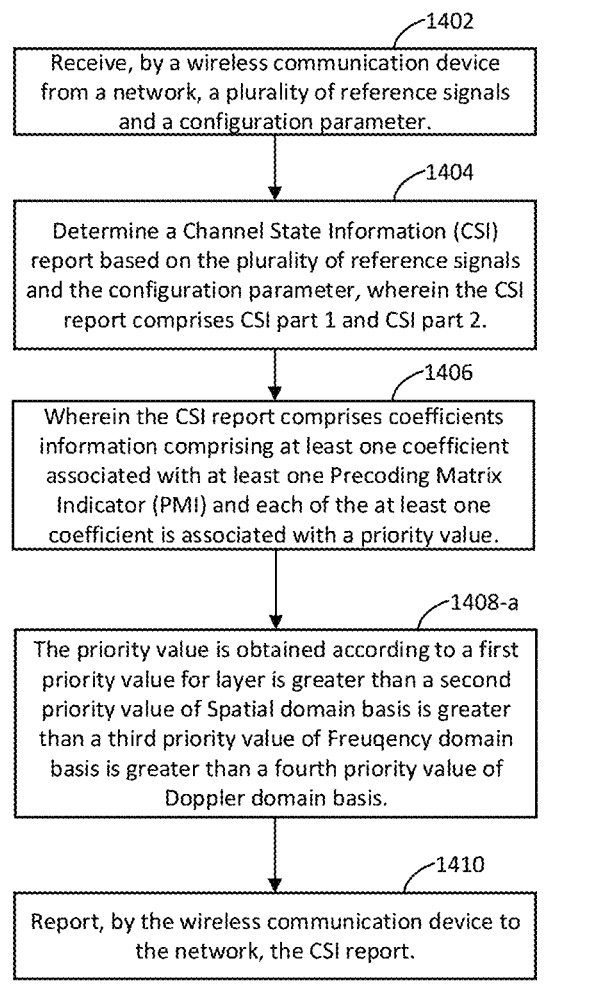
FIGS. 14A and 14B are flowchart diagrams illustrating example methods for CSI report enhancement, according to various arrangements.
Figure 14B:
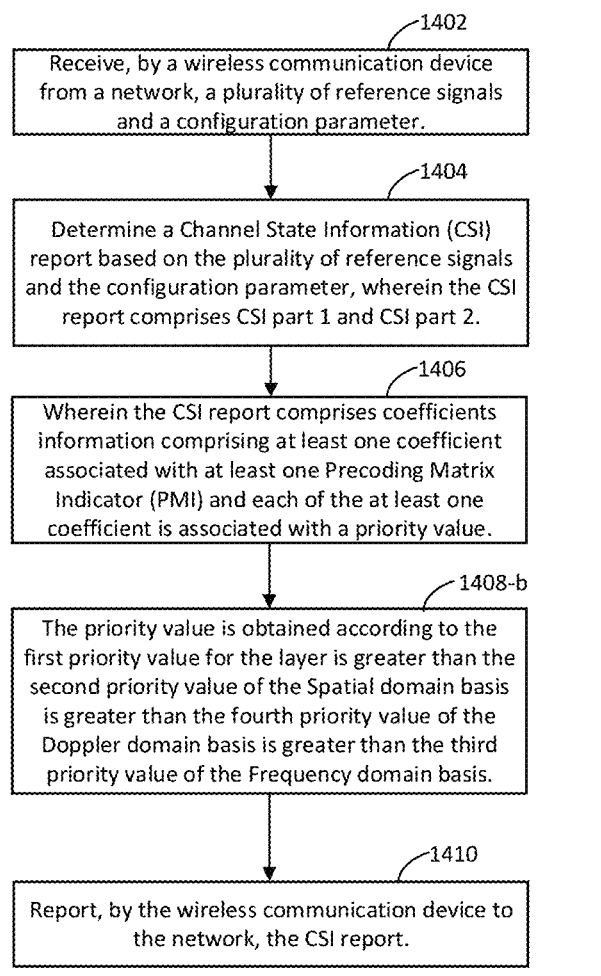

FIGS. 14A and 14B are flowchart diagrams illustrating example methods 1400-a and 1400-b for CSI report enhancement, according to various arrangements. In some cases, for priority formulation in enhanced Type II reports for a given CSI report n, multiple reported elements may be associated with a priority value. For example, the reported elements may include subband amplitude, subband phase, and location of coefficients, indexed by l, i, and f, such that the priority value may be denoted as Pri(l, i, f). In some examples, the element with the highest priority (e.g., relatively) has the lowest associated priority value. For example, a frequency domain (FD) basis with a priority value greater than a spatial domain (SD) basis priority value that is greater than a layer priority value (e.g., priority values: FD-basis>SD-basis>Layer) may have a priority that is less than the SD basis and the layer (e.g., priority: FD-basis<SD-basis<Layer).

In some examples, the priority values may be computed by the following equations:

$$Pri(l, i, f) = 2*L*v*\pi(f) + v*i + l \qquad \text{Equation 4}$$

$$\pi(f) = \min(2*n_{3,l}^{(f)}, 2*(N_3 - n_{3,l}^{(f)}) - 1) \qquad \text{Equation 5}$$

where $l = 1, 2, \ldots, v$, $i = 0, 1, \ldots, 2L-1$, and $f = 0, 1, \ldots, M_v - 1$.

At 1402, a wireless communication device may receive, from a network, multiple reference signals and a configuration parameter. In some implementations, the reference signals may be one or more CSI-RSs. In some cases, the configuration parameter may be a configuration for enabling two or more CQIs in the CSI report. For example, the network may transmit the configuration parameter via a radio resource control (RRC) message, a medium access control-control element (MAC-CE) message, a downlink control information (DCI) message, or any combination thereof, among other control and/or configuration messages. At 1404, the wireless communication device may determine a CSI report based on the multiple reference signals and the configuration parameter, where the CSI report comprises CSI part 1 and CSI part 2.

At 1406, the CSI report may include coefficients information comprising at least one coefficient associated with at least one PMI and each of the at least one coefficient is associated with a priority value. For example, in a first example embodiment, at 1408-a, the priority value is obtained according to a first priority value of layer that is greater than a second priority value of SD basis that is greater than a third priority value of FD basis that is greater than a fourth priority value of DD basis (e.g., DD-basis>FD-basis>SD-basis>Layer). Thus, the priority of the DD basis may be less than the FD basis, the SD basis, and the layer, in that order (e.g., DD-basis<FD-basis<SD-basis<Layer). In some examples, the priority values may be computed (e.g., obtained) by the following equations:

$$Pri(l, i, f, q) = 2*L*v*M_v*func(q) + 2*L*v*\pi(f) + v*i + l \quad \text{Equation 6}$$

$$func(q) = q \text{ or } func(q) = \pi(q), \pi(q) = \min(2*q, 2*(Q-1) - 1). \quad \text{Equation 7}$$

In a second example embodiment, at 1408-b, the priority value is obtained according to the first priority value of the layer that is greater than the second priority value of the SD basis that is greater than the fourth priority value of the DD basis that is greater than the third priority value of the FD basis (e.g., FD-basis>DD-basis>SD-basis>Layer). Thus, the priority of the FD basis may be less than the DD basis, the SD basis, and the layer, in that order (e.g., FD-basis<DD-basis<SD-basis<Layer). In some examples, the priority values may be computed (e.g., obtained) by the following equations:

$$Pri(l, i, f, q) = \qquad \text{Equation 8}$$
$$2*L*v*M_v*func(f) + 2*L*v*func(q) + v*i + l$$

and Equation 7. At 1410, the wireless communication device may report, to the network, the CSI report including the coefficients information.

Figure 15:
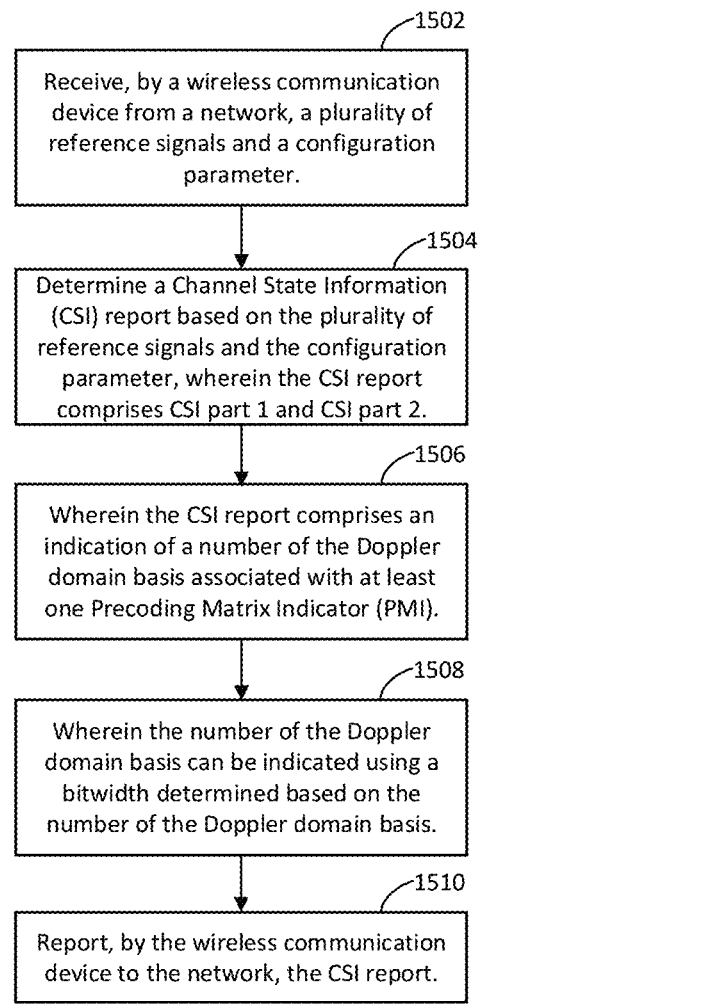
FIG. 15 is a flowchart diagram illustrating an example method for CSI report enhancement, according to various arrangements.

FIG. 15 is a flowchart diagram illustrating an example method 1500 for CSI report enhancement, according to various arrangements. In some cases, for DD basis, a selected Q DD basis for a DD basis set may be indicated by combinatorial coefficients.

At 1502, a wireless communication device may receive, from a network, multiple reference signals and a configuration parameter. In some implementations, the reference signals may be one or more CSI-RSs. In some cases, the configuration parameter may be a configuration for enabling two or more CQIs in the CSI report. For example, the network may transmit the configuration parameter via a RRC message, a MAC-CE message, a DCI message, or any combination thereof, among other control and/or configuration messages. At 1504, the wireless communication device may determine a CSI report based on the multiple reference signals and the configuration parameter, where the CSI report comprises CSI part 1 and CSI part 2.

At 1506, the CSI report may include an indication of a number of the DD basis associated with at least one PMI. At 1508, the number of the DD basis can be indicated using a bitwidth determined based on the number of the DD basis. For example, the bitwidth of the selected Q DD basis may be a first number (e.g., $[\log_2(Q)]$) or a second number (e.g., $[\log_2(Q-1)]$). In some cases, the number (e.g., information) of the DD basis (e.g., selected Q DD basis) is mapped to group 0 of the CSI part 2, group 1 of the CSI part 2, or group 2 of the CSI part 2, for one reporting instance. In some implementations, the first DD base may be selected (e.g., by default). At 1510, the wireless communication device may report, to the network, the CSI report including the number of the DD basis.

Figure 16:
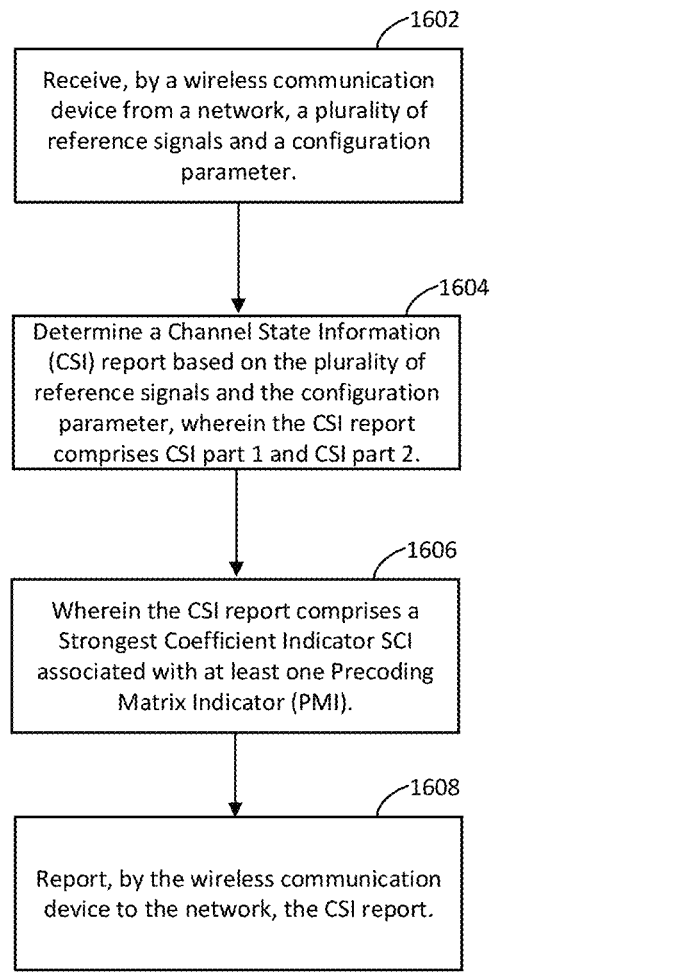
FIG. 16 is a flowchart diagram illustrating an example method for CSI report enhancement, according to various arrangements.

FIG. 16 is a flowchart diagram illustrating an example method 1600 for CSI report enhancement, according to various arrangements. In some cases, the method 1600 may include configurations for a CSI report to include a strongest coefficient indicator (SCI). For example, for each layer, each Q, or both, the SCI may be across selected SD basis, FD basis, DD basis, or any combination thereof.

At 1602, a wireless communication device may receive, from a network, multiple reference signals and a configuration parameter. In some implementations, the reference signals may be one or more CSI-RSs. In some cases, the configuration parameter may be a configuration for enabling two or more CQIs in the CSI report. For example, the network may transmit the configuration parameter via a RRC message, a MAC-CE message, a DCI message, or any combination thereof, among other control and/or configuration messages. At 1604, the wireless communication device may determine a CSI report based on the multiple reference signals and the configuration parameter, where the CSI report comprises CSI part 1 and CSI part 2.

At 1606, the CSI report may include an SCI associated with at least one PMI. In some implementations, a location of the SCI may be mapped to group 0 of CSI part 2, to group 0 of CSI part 2 for a first DD basis, to group 1 of CSI part 2 for a second DD basis, or any combination thereof, for one CSI reporting instance. A bitwidth of the SCI may be determined, for rank one, based on a total number of NZCs summed across multiple layers and across multiple numbers of DD basis, and for ranks two, three, and four, based on a value; or, for ranks one, two, three, and four, based on the value. In some implementations, the value is determined according to the number of the SD basis. For example, for rank equals one, the bitwidth of the location that the SCI occupies may be $[\log_2(K_{NZ})]$ bits, and for rank equals two, three, or four, the bitwidth of the location that the SCI occupies may be $[\log_2(2L)]$ bits. In some cases, for rank equals one, two, three, or four, the bitwidth of the location that the SCI occupies may be $[\log_2(2L)]$ bits. At 1608, the wireless communication device may report, to the network, the CSI report including the SCI.

Figure 17:
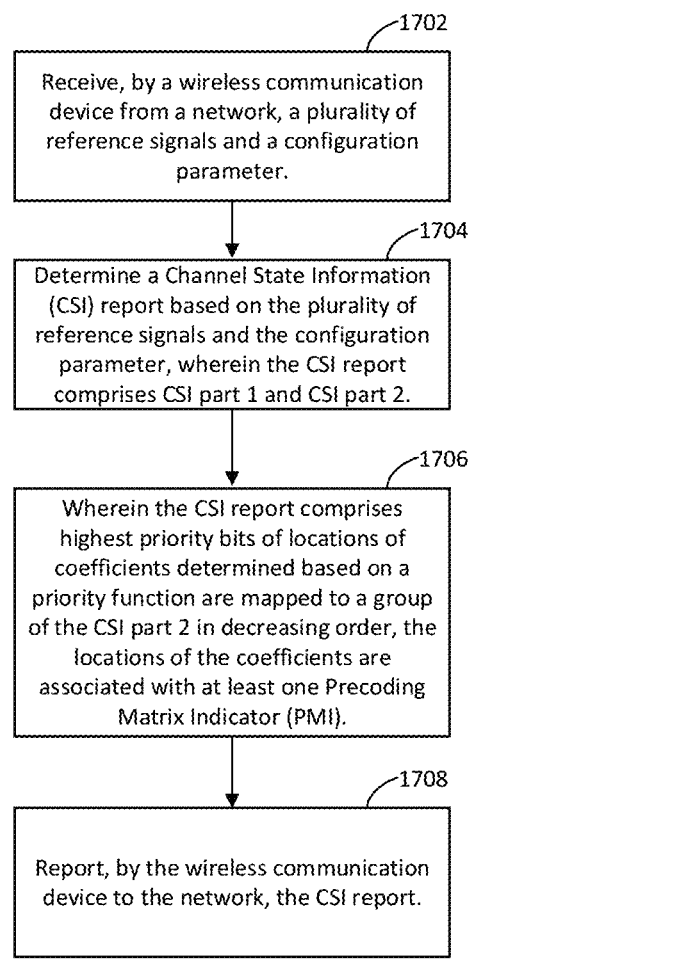
FIG. 17 is a flowchart diagram illustrating an example method for CSI report enhancement, according to various arrangements.

FIG. 17 is a flowchart diagram illustrating an example method 1700 for CSI report enhancement, according to various arrangements. In some cases, the method 1700 may include configurations for a CSI report to include highest priority bits of locations of coefficients associated with at least on PMI.

At 1702, a wireless communication device may receive, from a network, multiple reference signals and a configuration parameter. In some implementations, the reference signals may be one or more CSI-RSs. In some cases, the configuration parameter may be a configuration for enabling two or more CQIs in the CSI report. For example, the network may transmit the configuration parameter via a RRC message, a MAC-CE message, a DCI message, or any combination thereof, among other control and/or configuration messages. At 1704, the wireless communication device may determine a CSI report based on the multiple reference signals and the configuration parameter, where the CSI report comprises CSI part 1 and CSI part 2.

At 1706, the highest priority bits of locations of coefficients may be determined based on a priority function and may be mapped to a group of the CSI part 2 in decreasing order. In some implementations, the priority function may be determined according to index of DD basis, FD basis, SD basis, and/or layer index. In a first example embodiment, the highest priority bits of coefficient locations may be given by $v*2LM_v-[K^{NZ}/2]$, where $\{i_{1,7,i}: l=1, \ldots, v\}$, in decreasing order of priority based on function Pri(l, i, f).

In a second example embodiment, the highest priority bits may be further determined based on a number of the DD basis and mapped to group 1 of CSI part 2 in decreasing order. The CSI report may further include lowest priority bits determined based on the priority function and mapped to group 2 of the CSI part 2 in decreasing order. For example, the highest priority bits of coefficient locations may be given by $v*2LQM_v-[K^{NZ}/2]$ in decreasing order of priority based on function Pri(l, i, f, q) and mapped into group 1 of CSI part 2, for one CSI reporting instance. The lowest priority bits of coefficient locations may be given by $[K^{NZ}/2]$ in decreasing order of priority based on function Pri(l, i, f, q) and mapped into group 2 of CSI part 2, for one CSI reporting instance. In some implementations, referring back to Equation 2 of FIG. 11, if a total (e.g., maximum) allowed rank is one, then the total number of NZCs is a value (e.g., $K^{NZ}=K_0$); otherwise, if the total allowed rank is a number other than one, then the total number of NZCs is two times the value (e.g., $K^{NZ}=2K_0$).

In a third example embodiment, the highest priority bits may be further determined for each of the DD basis and mapped to group 1 of CSI part 2 in decreasing order. The CSI report may further include lowest priority bits determined based on the priority function and mapped to group 2 of the CSI part 2 in decreasing order. For example, the highest priority bits of coefficient locations may be given by $v*2LM_v-[K_{(q)}^{NZ}/2]$ in decreasing order of priority based on function Pri(l, i, f, q) and mapped into group 1 of CSI part 2, for one CSI reporting instance. The lowest priority bits of coefficient locations may be given by $K_{(q)}^{NZ}/2$ in decreasing order of priority based on function Pri(l, i, f, q) and mapped into group 2 of CSI part 2, for one CSI reporting instance. In some implementations, referring back to Equation 3 of FIG. 13, where q=i and q={0,1, ..., Q-1}, if a total (e.g., maximum) allowed rank is one, then the total number of NZCs is a value (e.g., $K_{(q)}^{NZ}=K(g)$); otherwise, if the total allowed rank is a number other than one, then the total number of NZCs is two times the value (e.g., $K_{(q)}^{NZ}=2K_{(q)}$).

In a fourth example embodiment, where the CSI part 2 includes multiple groups (e.g., adding more groups in CSI part 2 for one CSI reporting instance), the highest priority bits may be further determined for each number of the DD basis and mapped to group one of the multiple groups of CSI part 2 in decreasing order. The CSI report may further include lowest priority bits determined based on the priority function and mapped to the multiple groups of the CSI part 2 in decreasing order. For example, the highest priority bits of coefficient locations may be given by $v*2LM_v-[K_{(q)}^{NZ}/2]$ in decreasing order of priority based on function Pri(l, i, f, q) and mapped into group (q+1)*2−1 of CSI part 2, for one CSI reporting instance. The lowest priority bits of coefficient locations may be given by $[K_{(q)}^{NZ}/2]$ in decreasing order of priority based on function Pri(l, i, f, q) and mapped into group (q+1)*2 of CSI part 2, for one CSI reporting instance. In some implementations, referring back to Equation 3 of FIG. 13, where q=i and q={0,1, . . . , Q−1}, if a total (e.g., maximum) allowed rank is one, then the total number of NZCs is a value (e.g., $K_{(q)}^{NZ}=K_{(q)}$); otherwise, if the total allowed rank is a number other than one, then the total number of NZCs is two times the value (e.g., $K_{(q)}^{NZ}=2K_{(q)}$).

In some embodiments, the CSI report may be configured with two additional groups in CSI part 2 for one CSI reporting instance, such that there are 5 groups in CSI part 2 for one CSI reporting instance). For instance, in a fifth example embodiment, the highest priority bits may be further determined for each of a number of the DD basis. For a first number of DD basis, the highest priority bits for each number of the DD basis may be mapped to group 1 of CSI part 2 in decreasing order. The CSI report may further include lowest priority bits determined based on the priority function and mapped to group 2 of the CSI part 2 in decreasing order. For a second number of DD basis, the highest priority bits for each number of the DD basis may be mapped to group 3 of CSI part 2 in decreasing order. The CSI report may further include lowest priority bits determined based on the priority function and mapped to group 4 of the CSI part 2 in decreasing order. For example, for q=0, the highest priority bits of coefficients locations may be given by $v*2LM_v-[K_{(q)}^{NZ}/2]$ in decreasing order of priority based on function Pri(l, i, f, q) and mapped into group 1 of CSI part 2, for one CSI reporting instance. The lowest priority bits of NZC locations may be given by $[K_{(q)}^{NZ}/2]$ in decreasing order of priority based on function Pri(l, i, f, q) and mapped into group 2 of CSI part 2, for one CSI reporting instance. For q>0, the highest priority bits of coefficients locations may be given by $v*2LM_v-[K_{(q)}^{NZ}/2]$ in decreasing order of priority based on function Pri(l, i, f, q) and mapped into group 3 of CSI part 2, for one CSI reporting instance. The lowest priority bits of coefficients locations may be given by $[-K_{(q)}^{NZ}/2]$ in decreasing order of priority based on function Pri(l, i, f, q) and mapped into group 4 of CSI part 2, for one CSI reporting instance. In some implementations, referring back to Equation 3 of FIG. 13, where q=i and q={0,1, . . . , Q−1}, if a total (e.g., maximum) allowed rank is one, then the total number of NZCs is a value (e.g., $K_{(q)}^{NZ}=K_{(q)}$); otherwise, if the total allowed rank is a number other than one, then the total number of NZCs is two times the value (e.g., $K_{(q)}^{NZ}=2K_{(q)}$). At 1708, the wireless communication device may report, to the network, the CSI report including the highest priority bits.

While various arrangements of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of some arrangements can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device.

A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
   receiving, by a wireless communication device from a network, a plurality of reference signals and a configuration parameter;
   determining a Channel State Information (CSI) report based on the plurality of reference signals and the configuration parameter, wherein the CSI report comprises CSI part 1 and CSI part 2, wherein the CSI report comprises a plurality of Channel Quality Indicator (CQI) sets, and each of the plurality of CQI sets comprises a wideband CQI and at least one subband differential CQI associated with the wideband CQI, wherein a CQI mapping order in the CSI report comprises:
   for mapping to the CSI part 1: the wideband CQI for a first CQI set of the plurality of CQI sets, the at least one subband differential CQI for the first CQI set, in that order; and
   for mapping to the CSI part 2: the wideband CQI for a second CQI set of the plurality of CQI sets, the at least one subband differential CQI for the second CQI set, in that order; and
   reporting, by the wireless communication device to the network, the CSI report.

2. The method of claim 1, further comprising:
   sending, by the wireless communication device to the network, a User Equipment (UE) capability report indicating that the wireless communication device supports a number of Channel Quality Indicator (CQI) reports, wherein the number is a positive integer.

3. The method of claim 2, wherein:
   when a maximum allowed rank is 1, a total number of a non-zero coefficients is a value; and
   when the maximum allowed rank is a number other than 1, the total number of the non-zero coefficients is two times the value.

4. The method of claim 2, wherein:
   when a maximum allowed rank is 1, a total number of a non-zero coefficients is a value; and
   when the maximum allowed rank is a number other than 1, the total number of the non-zero coefficients is two times the value, wherein the value is determined based on a number of Doppler domain basis.

5. The method of claim 1, wherein the CSI report comprises, for the CSI part 1, an indicator for a total number of non-zero coefficients summed across a plurality of layers and across a plurality of numbers of Doppler domain basis, the non-zero coefficients are associated with at least one Precoding Matrix Indicator (PMI).

6. The method of claim 1, wherein at least one of:
   the configuration parameter is configured for enabling two or more Channel Quality Indicators (CQIs) in the CSI report; or
   the reference signals are aperiodic or semi-persistent.

7. The method of claim 1, wherein:
   the CSI report comprises a Strongest Coefficient Indicator (SCI) across a plurality of Spatial domain basis, Frequency domain basis, and Doppler domain basis, the SCI is associated with at least one Precoding Matrix Indicator (PMI);
   a location of the SCI is mapped to group 0 of the CSI part 2; and
   a bitwidth of the SCI comprises:
   for rank 1, the bitwidth is determined based on a total number of non-zero coefficients summed across a plurality of layers and across a plurality of numbers of Doppler domain basis, and for ranks 2, 3, and 4, the bitwidth is determined based on a value.

8. The method of claim 1, wherein a value is determined according to a number of a Spatial domain basis.

9. The method of claim 1, wherein the CSI report comprises highest priority bits of locations of coefficients determined based on a priority function are mapped to a group of the CSI part 2 in decreasing order, the locations of the coefficients are associated with at least one Precoding Matrix Indicator (PMI).

10. The method of claim 9, wherein:
the highest priority bits are determined based on a number of Doppler domain basis;
the highest priority bits determined based on the priority function are mapped to group 1 of CSI part 2 in the decreasing order; and
the CSI report comprises lowest priority bits determined based on the priority function are mapped to group 2 of the CSI part 2 in decreasing order.

11. The method of claim 9, wherein the priority function is determined according to indices of Doppler Domain (DD)-basis, Frequency Domain (FD)-basis and Spatial Domain (SB)-basis, and layer index.

12. A wireless communication method, comprising:
transmitting, by a network to a wireless communication device, a plurality of reference signals and a configuration parameter; and
receiving, by the network from the wireless communication device, a Channel State Information (CSI), the CSI report comprising CSI part 1 and CSI part 2, wherein the CSI report comprises a plurality of Channel Quality Indicator (CQI) sets, and each of the plurality of CQI sets comprises a wideband CQI and at least one subband differential CQI associated with the wideband CQI, wherein a CQI mapping order in the CSI report comprises:
  for mapping to the CSI part 1: the wideband CQI for a first CQI set of the plurality of CQI sets, the at least one subband differential CQI for the first CQI set, in that order; and
  for mapping to the CSI part 2: the wideband COI for a second CQI set of the plurality of CQI sets, the at least one subband differential CQI for the second CQI set, in that order.

13. A network node, comprising:
at least one processor configured to:
  transmit, via a transceiver to a wireless communication device, a plurality of reference signals and a configuration parameter; and
  receive, via the transceiver from the wireless communication device, a Channel State Information (CSI), the CSI report comprising CSI part 1 and CSI part 2, wherein the CSI report comprises a plurality of Channel Quality Indicator (CQI) sets, and each of the plurality of CQI sets comprises a wideband CQI and at least one subband differential CQI associated with the wideband CQI, wherein a CQI mapping order in the CSI report comprises:
    for mapping to the CSI part 1: the wideband CQI for a first CQI set of the plurality of CQI sets, the at least one subband differential CQI for the first CQI set, in that order; and
    for mapping to the CSI part 2: the wideband CQI for a second CQI set of the plurality of CQI sets, the at least one subband differential CQI for the second CQI set, in that order.

14. A wireless communication device, comprising:
at least one processor configured to:
  receive, via a transceiver from a network, a plurality of reference signals and a configuration parameter;
  determine a Channel State Information (CSI) report based on the plurality of reference signals and the configuration parameter, wherein the CSI report comprises CSI part 1 and CSI part 2, wherein the CSI report comprises a plurality of Channel Quality Indicator (CQI) sets, and each of the plurality of CQI sets comprises a wideband CQI and at least one subband differential CQI associated with the wideband CQI, wherein a CQI mapping order in the CSI report comprises:
    for mapping to the CSI part 1: the wideband CQI for a first CQI set of the plurality of CQI sets, the at least one subband differential CQI for the first CQI set, in that order; and
    for mapping to the CSI part 2: the wideband CQI for a second CQI set of the plurality of CQI sets, the at least one subband differential CQI for the second CQI set, in that order; and
  report, via the transceiver to the network, the CSI report.

15. The wireless communication device of claim 14, wherein the CSI report comprises a plurality of Channel Quality Indicator (CQI) sets, and at least one of the plurality of CQI sets comprises a wideband CQI and at least one subband differential CQI associated with the wideband CQI.

16. The wireless communication device of claim 15, wherein a CQI mapping order in the CSI report comprises:
  for mapping to the CSI part 1: the wideband CQI for a first CQI set of the plurality of CQI sets, the at least one subband differential CQI for the first CQI set, in that order; and
  for mapping to the CSI part 2: the wideband CQI for a second CQI set of the plurality of CQI sets, the at least one subband differential CQI for the second CQI set, in that order.

17. The wireless communication device of claim 14, wherein at least one of:
the configuration parameter is configured for enabling two or more Channel Quality Indicators (CQIs) in the CSI report; or
the reference signals are aperiodic or semi-persistent.

18. The wireless communication device of claim 14, wherein the at least one processor is configured to:
send, via a transmitter to the network, a User Equipment (UE) capability report indicating that the wireless communication device supports a number of Channel Quality Indicator (CQI) reports, wherein the number is a positive integer.

* * * * *